United States Patent [19]

Edlund

[11] Patent Number: 5,066,027
[45] Date of Patent: Nov. 19, 1991

[54] SEALING RING APPARATUS

[75] Inventor: Roy Edlund, Stuttgart, Fed. Rep. of Germany

[73] Assignee: Busak + Luyken GmbH & Co., Stuttgart, Fed. Rep. of Germany

[21] Appl. No.: 547,374

[22] Filed: Jul. 3, 1990

Related U.S. Application Data

[63] Continuation of Ser. No. 285,785, Dec. 16, 1988, abandoned.

[30] Foreign Application Priority Data

Dec. 23, 1987 [DE] Fed. Rep. of Germany ....... 3743726

[51] Int. Cl.$^5$ .......................... F16J 15/10; F16J 15/32
[52] U.S. Cl. ...................................... 277/165; 277/70; 277/75; 277/205; 277/208
[58] Field of Search .................... 277/165, 205, 206 R, 277/207 R, 208, 70, 74, 75, 76

[56] References Cited

U.S. PATENT DOCUMENTS

| | | | |
|---|---|---|---|
| 2,631,907 | 3/1953 | Johnson, Jr. | 277/165 |
| 2,937,061 | 5/1960 | Folkerts | 277/165 |
| 3,109,661 | 11/1963 | Swaim et al. | 277/165 |
| 3,418,001 | 12/1968 | Rentschler et al. | 277/165 |
| 4,331,065 | 5/1982 | Fellberg | 277/75 |
| 4,523,765 | 6/1985 | Heidemann | 277/165 |
| 4,681,327 | 10/1986 | D'Agostino et al. | 277/165 X |
| 4,702,482 | 10/1987 | Oseman | 277/165 |
| 4,709,932 | 12/1987 | Edlund et al. | 277/165 |
| 4,714,259 | 12/1987 | Mack et al. | 277/165 |
| 4,723,782 | 2/1988 | Müller | 277/165 X |
| 4,749,201 | 6/1988 | Hunger | 277/165 |
| 4,953,876 | 9/1990 | Müller | 277/165 |

Primary Examiner—William A. Cuchlinski, Jr.
Assistant Examiner—James K. Folker
Attorney, Agent, or Firm—Cohn, Powell & Hind

[57] ABSTRACT

A structure for sealing the gap between two concentric machine parts which are arranged to move relative to each other comprises a sealing ring which is made of a tough-elastic plastic material and which bears upon the contact surface of the second machine part by sealing edges arranged near its ends, the surface of the sealing ring facing the bottom of the groove being provided with an annular groove of substantially trapezoidal cross-section. The space bettween the sealing edges is connected with the bottom of the annular groove by one radial bore. A stressing ring of a rubber-elastic material is arranged in the annular groove, between the sealing ring and the bottom of the groove, which loads the sealing ring in the radial direction and which has an axial cross sectional length smaller than that of the sealing ring. The stressing ring is perfectly fixed by this arrangement relative to the sealing ring. At the same time, the stressing ring and the radial bore form together a valve relieving the sealing ring, while preventing at the same time the sealing from being lifted off, when an over-pressure builds up between the sealing edges.

3 Claims, 2 Drawing Sheets

SEALING RING APPARATUS

This is a continuation of copending application Ser. No. 07/285,785 filed on Dec. 16, 1988 and now abandoned.

BACKGROUND OF THE INVENTION

The present invention relates to a structure for sealing the gap between two concentric machine parts which are arranged to move relative to each other, the first machine part being provided with a groove while the second one comprises a plain contact surface arranged opposite the said groove, the sealing ring structure comprising a sealing ring made of a tough-elastic plastic material and fitted in the groove of the first machine part, with a circumferential surface of the said sealing ring facing the contact surface being provided with an annular recess so that the sealing ring bears upon the contact surface of the second machine part by sealing edges arranged near its ends, and comprising further a stressing ring of a rubber-elastic material arranged between the sealing ring and the bottom of the groove and loading the sealing ring in the radial direction, the axial cross sectional length of the said stressing ring being smaller than that of the sealing ring, and its axial position being fixed, relative to the sealing ring, in such a manner that it occupies a substantially central position between the two sealing edges.

A sealing ring structure of this type has been known from DE-PS 36 13 880. In the case of this sealing arrangement, the groove of the one machine part accommodating the sealing ring and the stressing ring is provided in its central area with a recess which is engaged by the stressing ring so that the axial position of the stressing ring is fixed by this recess while the axial position of the sealing ring is fixed by the groove. The production of a groove which is provided with a recess in its central area requires a considerably increased input of labor during manufacture of the sealing ring structure. In particular, such a design makes it impossible to use such a sealing ring structure in place of other sealing ring structures whose grooves intended to accommodate the sealing rings do not comprise any such recess. Although it would in principle be possible to arrange supporting bodies in the groove of conventional sealing ring structures, for supporting the stressing ring laterally, this would increase substantially the complexity of such a sealing ring structure.

The known seal belongs to the type comprising sealing edges arranged in series, which become active in operation so that the function is similar to that of a tandem seal. Consequently, certain quantities of the highly pressurized fluid which is to be sealed off, which may pass the sealing edge at the high-pressure side may gather in the space between the two sealing edges. In this manner, a considerable pressure rise may occur in the space between the two sealing edges, with the result that the sealing edges may be lifted off the contact surface of the second machine part, and a certain leakage may occur. Although the solution to interconnect the space between two sealing edges of the sealing ring with that side of the sealing ring which is in contact with the stressing ring, by a radial channel, has to be regarded as state of the prior art since the publication of patent application No. P 36 20 539.7, the stressing ring of the sealing ring structure described by patent application No. P 36 20 539.7 exhibits substantially the same axial length as the sealing ring, and the channel ends at a point near the high-pressure edge of the surface where the stressing ring is in contact with the sealing ring.

SUMMARY OF THE INVENTION

Now, it is the object of the present invention to improve a sealing ring structure of the type described above in such a manner that its production is simplified and trouble caused by pressure building up in the space defined by the sealing edges, between the sealing ring and the contact face of the second machine part, is avoided.

This object is achieved according to the invention by an arrangement which is characterized in that the sealing ring comprises, at its surface facing the bottom of the groove, an annular groove of substantially trapezoidal cross-section accommodating the stressing ring which is in sealing contact with its inclined flanks, at least in the unpressurized condition, and further at least one radial bore interconnecting the recess between the sealing edges and the bottom of the annular groove.

In the case of the arrangement according to the invention, therefore, the stressing ring is fixed relative to the sealing ring by a groove provided in the circumferential surface of the sealing ring and exhibiting a substantially trapezoidal cross-section. The radial bores interconnecting the space between the sealing edges and that side of the sealing ring which is loaded by the stressing ring end at the bottom of the annular groove and accordingly, when no load is applied, at a central point relative to the stressing ring loading the sealing ring. However, during operation the stressing ring is deformed to a certain degree towards the low-pressure side, under the action of the pressure of the fluid to be sealed off, whereby the contact pressure exerted by the stressing ring upon the flank of the annular groove on the low-pressure side rises, while the contact pressure is reduced at the flank of the annular groove on the high-pressure side, so that the stressing ring is lifted off the flank of the groove on the high-pressure side when the pressure of the fluid present in the space defined by the sealing edges exceeds a predetermined amount, and the excessively pressurized fluid is then permitted to escape towards the high-pressure side so that no leakage will occur.

The particular advantage of the sealing ring structure according to the invention is seen for one thing in the fact that its structure is substantially simplified because no additional recess has to be worked into the groove for accommodating the rings so that the rings may be inserted into the groove of any usual sealing ring structure, and that the arrangement of the radial bores in conjunction with the stressing ring provides sort of a pressure-relief valve for relieving the annular space between the two sealing edges of the sealing ring. On the other hand, it is a particular additional advantage of this sealing ring structure that when a symmetrical design is used for the sealing ring it acts in both directions, i.e. independently of the side on which the pressurized fluid acts upon the sealing ring structure. Consequently, a sealing ring structure of this type can be used with particular advantage in all cases where the prevailing operating conditions may lead to changes in the direction from which the pressurized fluid acts upon the seal. Finally, it is another advantage of the sealing ring structure according to the invention that it is insensitive to relatively big tolerances because the deformation to which the stressing ring is subjected in its operative position between the sealing ring and the bottom of the groove in the first machine part, due to the cross-section of the annular groove, makes it possible to use O rings of relatively big chord diameters as stressing rings so that the latter permit relatively considerable deformations which makes them insensitive also to different deformations required for balancing out any tolerances.

While on the one hand a simple O ring is used as stressing ring, the sealing ring may be given different cross-sections to adapt it optimally to the respective application. In particular, at least one of the sealing edges may be formed by the edge of the circumferential surface of an annular web provided at the end of the sealing ring, a design which has already been employed by the sealing ring structure of DE-PS 36 13 880 mentioned at the outset. The circumferential surface of the web may again form with the contact surface of the second machine part a small angle opening in the direction of the neighboring end face of the sealing ring. The term "small angle" as used herein is meant to describe angles of up to approx. 10°.

However, such a small angle may result already from the sealing ring being bent in the area between its two sealing edges by the pressure exerted by the stressing ring so that the sections of the sealing ring outside the sealing edges are lifted off the contact surface of a second machine part. Other details and embodiments of the invention will appear from the following description of the cross-section through a sealing structure according to the invention which is illustrated in the drawings by way of example. The features that can be derived from the specification and the drawings may be used in other embodiments of the invention either individually or in any combination thereof.

DESCRIPTION OF THE PREFERRED EMBODIMENT

Figure 1:
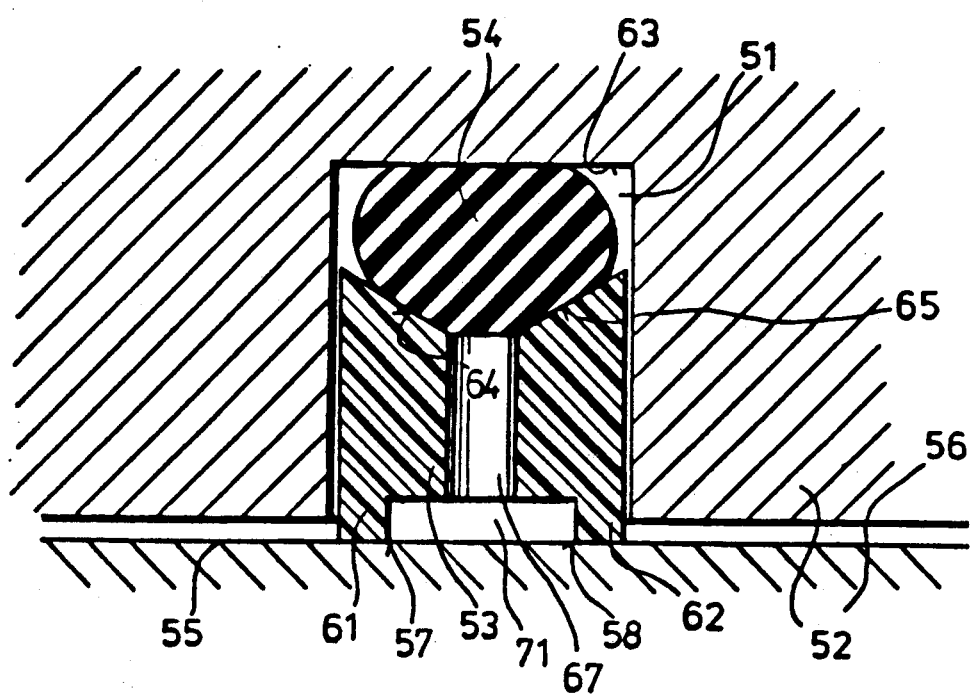
FIG. 1 shows a cross sectional view of the sealing ring structure.

FIG. 1 shows a sealing ring structure where a symmetrically designed sealing ring 53 is arranged in the groove 51 of a first component 52. The sealing ring 53 consists of a tough-elastic plastic material, and its inner circumferential surface rests against the contact surface 55 of a second machine part 56. The inner circumferential surface of the sealing ring 53 is provided with an annular recess so that each of the two ends of the sealing ring exhibits a web 61 or 62 and defining each a sealing edge 57, 58, respectively. The two sealing edges define between them the space 71 formed by the annular recess and intended to accommodate a fluid that may gather therein. The space 71 communicates with the opposite side of the sealing ring 53 via at least one radial bore 67. The radial bore 67 ends at the bottom of an annular groove of trapezoidal cross-section which is defined by flanks 64, 65 rising from the bottom of this groove. The described annular groove accommodates a stressing ring 54 of a rubber-elastic material, which is held in place in the first component between the sealing ring 53 and the bottom 63 of the groove 51.

The arrangement illustrated by way of example exhibits a fully symmetrical design. Accordingly, it is active irrespective of the side from which the pressurized fluid, which is to be sealed off, acts upon the arrangement. If, for example, the pressurized fluid is present on the left side of the sealing ring structure—as viewed in the drawing—then the pressure exerted upon the sealing ring 53 acts upon the right flank 65 of the groove 51, and the stressing ring 54 is also deformed a little towards the right, whereby the contact pressure prevailing at the left flank 64 of the annular groove in the sealing ring 53, at the high-pressure side, and also the force required for lifting the stressing ring 54 off the ends of the radial bore 57, is reduced. Consequently, any pressure fluid that may have been dragged into the space 71 may escape towards the high-pressure side, through the radial bore 67 and along the flank 64 of the annular groove, once a predetermined overpressure is exceeded, because the contact pressure exerted by the stressing ring 54 upon this flank 64 at the high-pressure side is considerably lower than that exerted upon the opposite flank 65 on the low-pressure side. If, however, the higher pressure were encountered on the right side of the sealing ring structure—as viewed in the drawing—then the sealing ring 53 and the stressing ring 54 would be deformed accordingly towards the left so that once a predetermined overpressure were reached, any pressure fluid dragged into the space 51 would be permitted to escape along the flank 65 of the annular groove in the sealing ring 53 on the high-pressure side, which would be subjected to the lower pressure in this case. Consequently, the sealing ring structure obtained is of the type acting in both directions which can be used with particular advantage for sealing off against each other two spaces in which the pressure alternates frequently so that the overpressure prevails in the one instance in the right and in the other instance in the left space. Working spaces of this type which have to be sealed off relative to each other are encountered very often in working machines using hydraulic drive.

Figure 2:
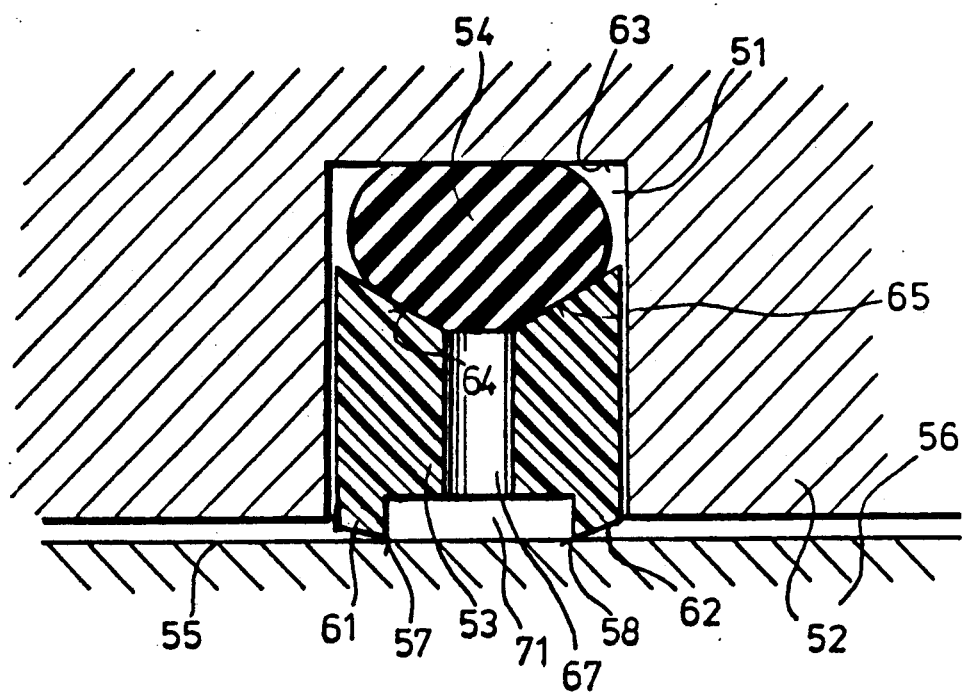
FIG. 2 shows a cross sectional view of a modified sealing ring structure with a small angle opening on the face of the sealing ring.

It is understood that the invention is not restricted to the embodiments illustrated in FIG. 2. For example, as shown in FIG. 2, the webs 61, 62 provided at the ends of the sealing ring 53 may comprise circumferential surfaces forming with the contact surface of the second machine part a small angle opening towards the neighboring end face of the ring. Such an angle, which should not be greater than 10°, need not necessarily exist already in the unstressed condition of the stressing, but may result from the sealing ring bending slightly under the action of the force of the stressing ring. Moreover, the sealing ring structure according to the invention is suited not only for sealing off parts reciprocating in the axial direction of the sealing ring structure, i.e. for sealing in particular the gap between piston rods and their housings. Rather, it is equally well suited for sealing off parts rotating relative to each other, such as shafts. It is of particular importance in this connection that in any of the cases the stressing ring is pressed, under the action of the pressurized fluid, into a gap which narrows in the axial direction due to the inclined flanks of the trapezoidal annular groove so that very high frictional forces are generated between the stressing ring 54 on the one hand and the one machine part 52 or the sealing ring 53 on the other hand. It is thereby ensured that the sealing ring will not rotate relative to the first machine part 52 provided with the groove 51, and that the sliding contact will be restricted exclusively to the contact surface between the second machine part 56 and the sealing ring 53.

It should be finally noted that, in particular when the sealing ring structure is used for sealing off a reciprocating rod, the pressure fluid dragged into the space 71 defined by the sealing edges and the pressure building up consequently in this space have the result to relieve the stress on the sealing edges 57, 58, which effect will continue to exist when the pressure difference between the two sides separated by the sealing ring structure has ceased to exist, because the pressure space delimited by the stressing ring 54 will be opened only when the pressure prevailing in the said space 51 exceeds the fluid pressure by an amount which is determined by the contact pressure exerted by the stressing ring 54.

I claim as my invention:

1. Structure for sealing a gap between two concentric machine parts which are arranged to move relative to each other, the first machine part being provided with a groove while the second machine part includes a plain contact surface arranged opposite said groove, a sealing ring made of a tough-elastic plastic material adapted to fit in the groove of the first machine part, with a first circumferential surface facing an annular bottom surface the groove and a second circumferential surface facing the contact surface of the second machine part, the second circumferential surface being provided with opposed ends and an annular recess therebetween defining spaced sealing edges bearing upon the contact surface of the second machine part, the surface facing the groove bottom surface being provided with its own annular groove, a stressing ring of a rubber-elastic material, arranged in the annular groove between the sealing ring and the groove bottom surface of the first machine part, the sealing ring groove being substantially trapezoidal in cross-section with inclined flanks so that due to an increase in pressure the stressing ring rides up one of the inclined flanks, moving upwardly to load the sealing ring in the radial direction sealing one of the spaced sealing edges, the sealing ring comprising further at least one radial bore interconnecting the recess between the sealing edges and the bottom of the annular groove, said sealing ring also being of symmetrical design, relative to its center axis in the radial direction.

2. Structure according to claim 1, in which: the sealing ring includes an annular web disposed at one end of said sealing ring and having a circumferential surface defining an edge and at least one of the said sealing edges is formed by said edge.

3. Structure according to claim 2, in which: said circumferential surface of the web forms with the contact surface of the second machine part a small angle opening towards a neighboring end face of said sealing ring.

* * * * *